United States Patent [19]

Bentley et al.

[11] Patent Number: 4,584,828
[45] Date of Patent: Apr. 29, 1986

[54] BRUSH RAKE

[76] Inventors: Robert J. Bentley; William G. Bentley, both of E. Main Rd., R.R. 2; Alan D. Waters, E. Main Rd., R.R. 45B, all of Ripley, N.Y. 14775

[21] Appl. No.: 607,515

[22] Filed: May 7, 1984

[51] Int. Cl.⁴ .................... A01D 46/28; A01D 78/04
[52] U.S. Cl. .................................... 36/377; 36/328 R
[58] Field of Search .............. 56/12.4, 16.1, 377, 56/395, 328 R, 367, 376, DIG. 21, 233, 12.7, 327 R

[56] References Cited

U.S. PATENT DOCUMENTS

| | | | |
|---|---|---|---|
| 2,193,506 | 3/1940 | Beekmann | 97/40 |
| 2,305,959 | 12/1942 | Frederiksen | 56/25 |
| 2,318,202 | 5/1943 | Colvin et al. | 56/25 |
| 2,436,475 | 2/1948 | Jones et al. | 56/377 |
| 2,459,961 | 1/1949 | Pollard | 56/372 |
| 2,573,971 | 11/1951 | Hoefer | 56/27 |
| 2,575,369 | 11/1951 | Thornton-Trump | 56/25 |
| 2,583,571 | 1/1952 | Howe | 97/12 |
| 2,603,053 | 7/1952 | Lipe et al. | 56/27 |
| 2,645,073 | 7/1953 | Dalglish et al. | 56/25 |
| 2,652,679 | 9/1953 | Krause | 56/372 |
| 2,657,519 | 11/1953 | Hill | 56/377 |
| 2,710,519 | 6/1955 | Winter | 56/377 |
| 2,718,836 | 9/1955 | Pertics et al. | 97/43 |
| 2,749,824 | 6/1956 | Friday | 97/43 |
| 2,751,832 | 6/1956 | Briscoe | 97/35 |
| 2,796,723 | 6/1957 | Smith et al. | 56/377 |
| 2,826,129 | 3/1958 | Olson | 97/40 |
| 2,829,486 | 4/1958 | Skromme et al. | 56/376 |
| 2,838,901 | 6/1958 | Davis | 56/25.4 |
| 2,847,814 | 8/1958 | Weaver | 56/27 |
| 2,851,842 | 9/1958 | Harp | 56/25.4 |
| 2,851,847 | 9/1958 | Van der Lely et al. | 56/377 |
| 2,861,413 | 11/1958 | Van der Lely et al. | 56/377 |
| 2,866,309 | 12/1958 | Andor | 56/377 |
| 2,906,084 | 9/1959 | Weaver | 56/377 |
| 2,922,269 | 1/1960 | Van der Lely et al. | 56/377 |
| 2,926,481 | 3/1960 | Van der Lely et al. | 56/393 |
| 2,945,339 | 7/1960 | Van der Lely et al. | 56/377 |
| 2,955,406 | 10/1960 | Van der Lely et al. | 56/377 |
| 2,975,582 | 3/1961 | Pollard | 56/377 |
| 2,982,081 | 5/1961 | Cooley | 56/377 |
| 3,006,132 | 10/1961 | Van der Lely et al. | 56/370 |
| 3,006,420 | 10/1961 | Coogan | 172/5 |
| 3,016,676 | 1/1962 | Van der Lely et al. | 56/377 |
| 3,019,586 | 2/1962 | Gustafson | 36/400 |
| 3,093,953 | 6/1963 | Van der Lely et al. | 56/377 |
| 3,115,739 | 12/1963 | Thoen et al. | 56/6 |
| 3,125,845 | 3/1964 | Lee | 56/377 |
| 3,138,208 | 6/1964 | Simms | 172/38 |
| 3,177,950 | 4/1965 | Laikam | 172/5 |
| 3,183,654 | 5/1965 | Jordan et al. | 56/28 |
| 3,217,813 | 11/1965 | Koemel | 172/177 |
| 3,243,947 | 4/1966 | Goodall et al. | 56/377 |
| 3,261,150 | 7/1966 | Fitzgerald, Sr. | 56/25.4 |
| 3,308,611 | 3/1967 | Barker | 56/25 |
| 3,393,752 | 7/1968 | Hill et al. | 172/527 |
| 3,444,674 | 5/1969 | Huff et al. | 56/295 |
| 3,667,200 | 6/1972 | Pool et al. | 56/378R |
| 3,832,838 | 9/1974 | Hale | 56/377 |
| 3,888,370 | 6/1975 | Gamblin | 56/328 R |
| 3,913,681 | 10/1975 | Lincoln et al. | 172/5 |
| 4,047,370 | 9/1977 | Eve | 56/377 |
| 4,172,356 | 10/1979 | Cole | 56/377 |
| 4,189,901 | 2/1980 | Poettgen | 56/10.4 |
| 4,214,429 | 7/1980 | Ellis | 56/377 |
| 4,328,660 | 5/1982 | Simmons | 56/12.7 |
| 4,329,836 | 5/1982 | Scudder | 56/233 |
| 4,383,400 | 5/1983 | Mead et al. | 56/330 |

FOREIGN PATENT DOCUMENTS 686548 1/1953 United Kingdom .

Primary Examiner—Robert P. Swiatek
Assistant Examiner—John G. Weiss
Attorney, Agent, or Firm—Bean, Kauffman & Bean

[57] ABSTRACT

A rake for removing brush or trimmings from vines arranged in a row features a power driven wheel carrying two staggered rows of teeth sized and arranged to effectively remove brush from the vines, and a plow or comb shaped and arranged to effectively remove brush from the teeth in order to prevent the buildup thereof on the periphery of the wheel. The rake additionally features an improved arrangement for permitting adjustable mounting thereof on the front end of a tractor to accommodate for variations in spacing between rows, as well as variations in tractor configuration.

21 Claims, 7 Drawing Figures

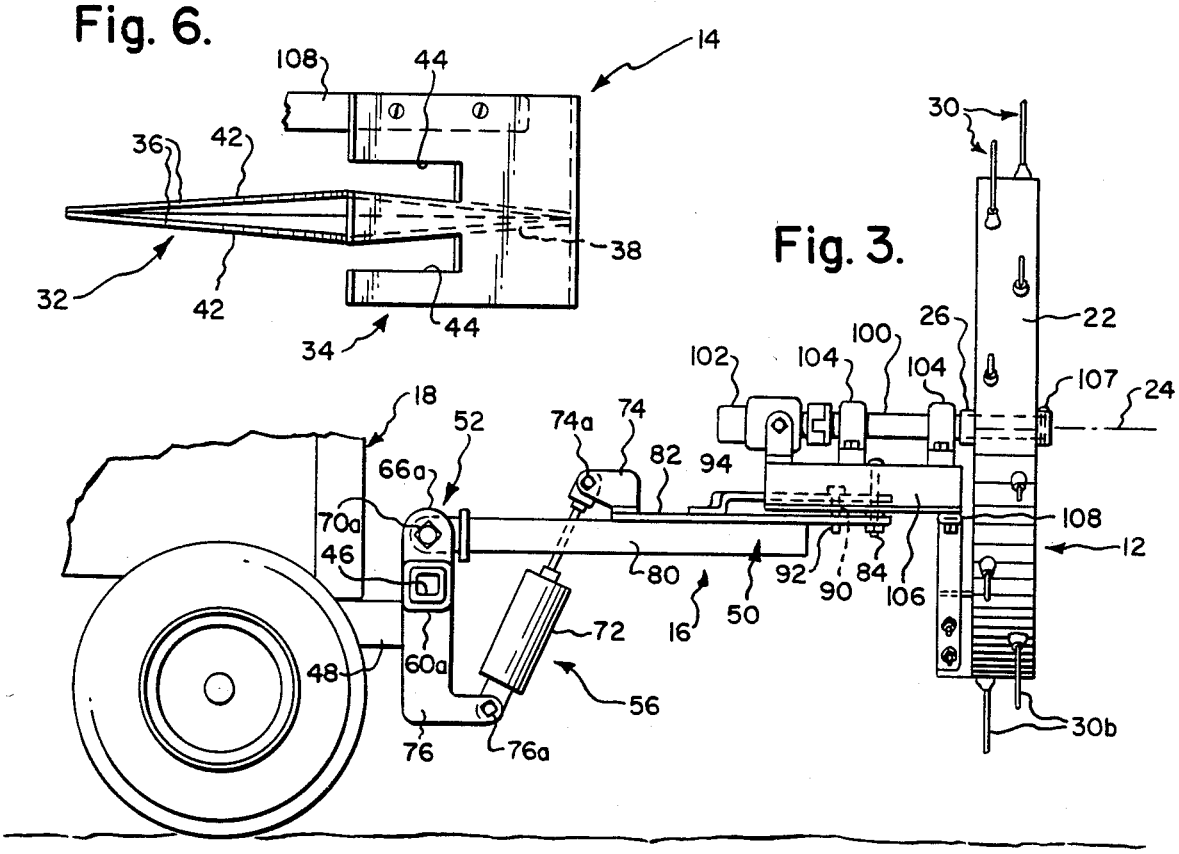
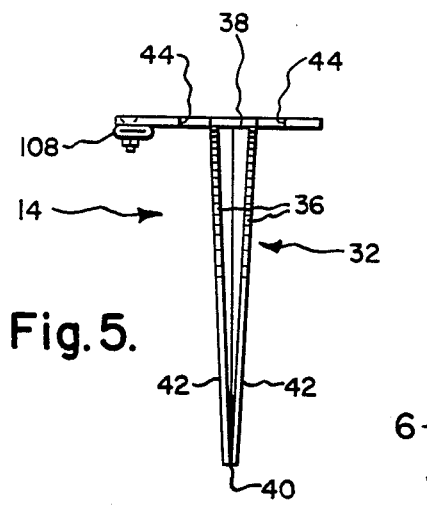
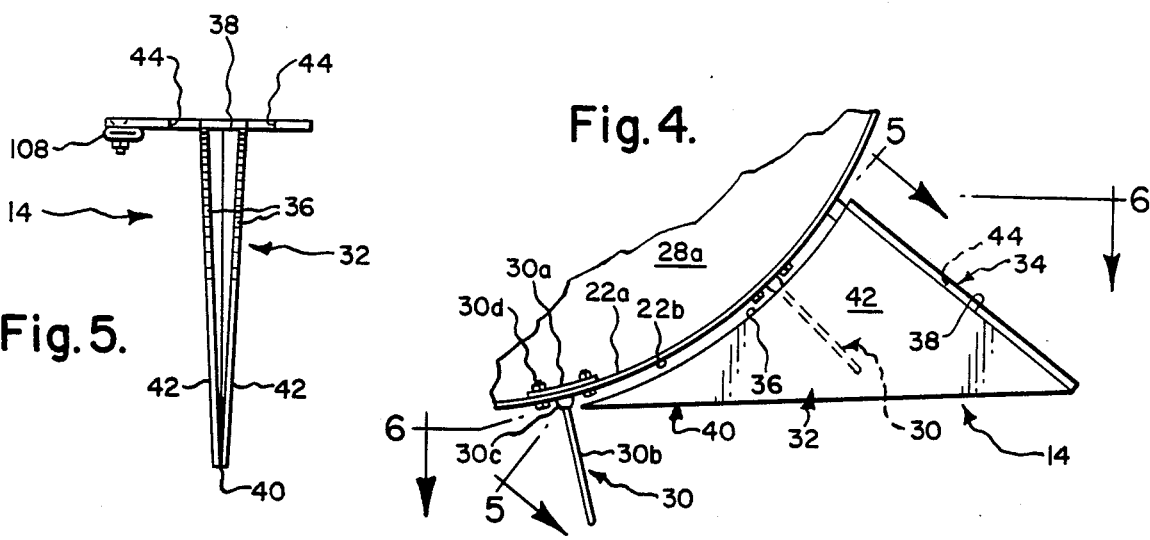
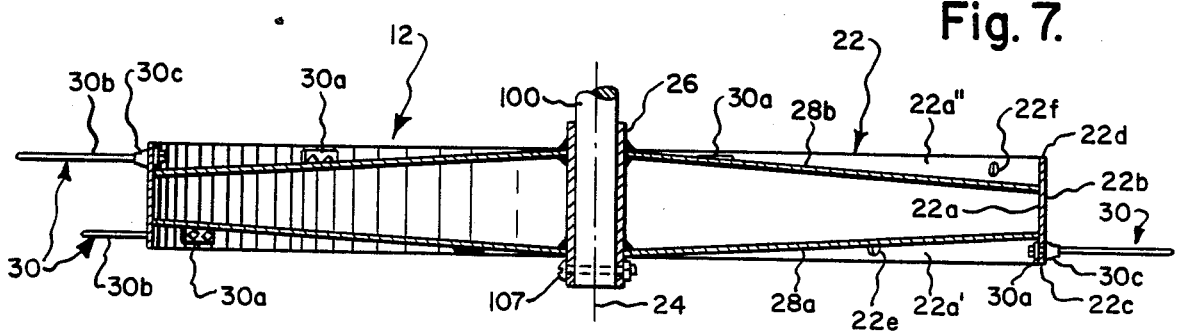

BRUSH RAKE

BACKGROUND OF THE INVENTION

The present invention relates to brush rakes, and more particularly, to a rake for removing brush or trimmings from grape vines arranged in a row.

In prior U.S. Pat. No. 4,214,429, there is disclosed a commercially available brush rake, which includes a tongue member having a rear end adapted to be attached to the front end of a farm vehicle for movement about a horizontal axis extending transversely of such vehicle; a frame pivotally connected to a front end of the tongue by a generally vertically disposed pivot; a rake wheel supported on the frame for rotation relative thereto, as an incident to engagement of its teeth with the ground; and fingers arranged to straddle the rim of the rake wheel for removing brush from its teeth. The rake wheel normally tends to assume a position, wherein its axis of rotation tilts vertically upwardly in the direction of vehicle movement and tilts laterally in a direction away from a row of vines from which brush is to be removed incident to rotations of the rake wheel. Spring devices are provided to permit movement of the rake wheel about the vertical pivot incident to engagement of the rake wheel with a fixed object, such as a trellis supporting post, whereupon the axis of rotation of the rake wheel is swung to assume a position in which it tilts laterally in a direction towards the row of vines and the normal direction of rotation of the rake wheel is reversed. Reversal of the direction of rotation of the rake wheel is intended to assist the rim straddling fingers in effecting removal of accumulated brush from the rake teeth.

Field tests conducted on a commercially available brush rake fabricated and operated in accordance with the teachings of U.S. Pat. No. 4,214,429 revealed that same possesses several drawbacks, which have apparently prevented wide acceptance thereof for use in the grape industry. First, among these drawbacks, it has been found that the brush rake is not well adapted for use in removing brush from umbrella trained vines and that even when used on no-tie or Geneva double curtain trained vines for which it appears best adapted for use, brush is not entirely removed and a subsequent or final manual brush removal operation is required. Secondly, it was found that even when the rake wheel was permitted to undergo periodic counter rotations, there was a decided tendency for brush to accumulate or build up on the rake teeth and often times to a depth, such as would render the rake wheel inoperative until accumulated brush was removed by hand.

SUMMARY OF THE INVENTION

The present invention is directed towards an improved brush rake adapted to effectively remove brush or trimmings from diversely cultivated vines, while avoiding the buildup of brush on its rake wheel.

The present brush rake is adapted for mounting adjacent the front end of the vehicle movable lengthwise of a row of vines from which brush is to be removed, and generally comprises a power driven wheel preferably carrying two rows of teeth projecting outwardly of a peripheral surface thereof for removing brush from vines incident to rotation of the wheel about its axis rotation; a comb for removing brush from the teeth; and mounting means for mounting the wheel and the comb on the vehicle and to arrange the rotational axis of the wheel to tilt vertically downwardly and forwardly away from the vehicle and to tilt laterally away from the row.

The rake wheel employed in the present construction is designed to provide a strong and relatively lightweight wheel whose design facilitates removable mounting of two rows of rake teeth whose arrangement has been found to provide for particularly effective brush removal operation from diversely cultivated vines.

The present invention additionally features a novelly designed plow or comb, which is particularly effective in effecting removal of brush from the rake teeth in order to prevent the buildup of brush on the rake wheel, such as would otherwise render the same inefficient or inoperative for brush removal purposes.

The present invention additionally features an improved mounting arrangement for a brush rake facilitating its adjustable positioning transversely of the direction of travel of a vehicle, so as to accommodate the brush rake for use with different sizes of vehicles, as well as for use in vineyards having different spacings between adjacent rows of vines.

Numerous tests were conducted in vineyards having diversely cultivated vines commonly found in the eastern United States, for purposes of comparing operation of the brush rake of the present invention and a commercially obtained brush rake fabricated in accordance with the teachings of U.S. Pat. No. 4,214,429. It was found that the brush rake of the present invention is adapted to effectively remove at least an estimated 95% of the brush from umbrella cultivated vines, whereas the patented brush rake does not appear capable of removing more than an estimated 35% to 40% of the brush from such vines. Tests conducted on no-tie and Geneva double curtain trained vines showed that the patented brush rake was capable of typically removing an estimated 50% to 60% of the brush therefrom, whereas the present brush rake in most cases was effective for removing at least an estimated 98% of brush therefrom.

Field tests have additionally demonstrated that the brush rake of the present invention can be more accurately controlled by a vehicle operator, so as to limit to a minimum the occurrence of destructive engagement of the rake wheel with trellis posts, and thereby avoid the necessity of providing spring devices to control pivotal movements of the rake wheel about its vertical pivot. A breakaway capability using a shear pin was retained in the test unit solely for purpose of avoiding severe damage to the equipment or the trellis. However, continued hours of testing without a single shear pin failure indicates that a breakaway feature may not be needed on commercial versions of the present brush rake.

THE DRAWINGS

The nature and mode of operation of the present invention will now be more fully described in the following detailed description taken with the accompanying drawings wherein:

FIG. 3 is a side elevational view of the rake, as viewed generally along the line 7—7 in FIG. 2;

FIG. 4 is an enlarged side elevational view of the comb;

FIG. 5 is an end view of the comb, as viewed along the line 5—5 in FIG. 4;

FIG. 6 is a top plan view of the comb, as viewed along the line 6—6 in FIG. 4; and FIG. 7 is a sectional view taken generally along the line 7—7 in FIG. 2.

DETAILED DESCRIPTION

Figure 1:
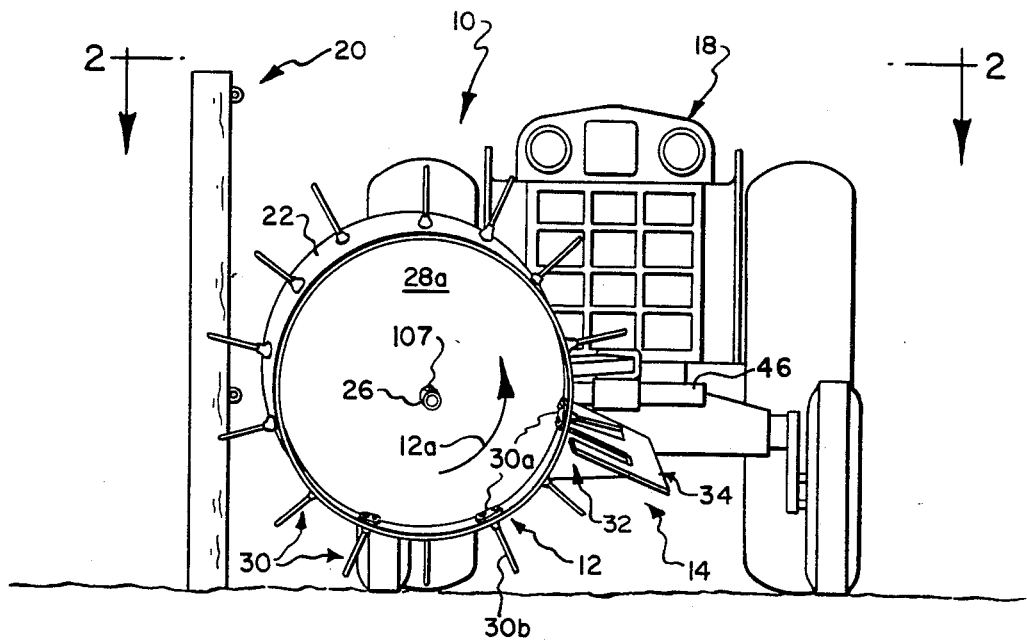
FIG. 1 is a front elevational view of the brush rake of the present invention, showing the rake wheel in operating position, wherein its rotational axis tilts vertically downwardly and forwardly in a direction away from the vehicle and tilts laterally away from the row.
Figure 2:
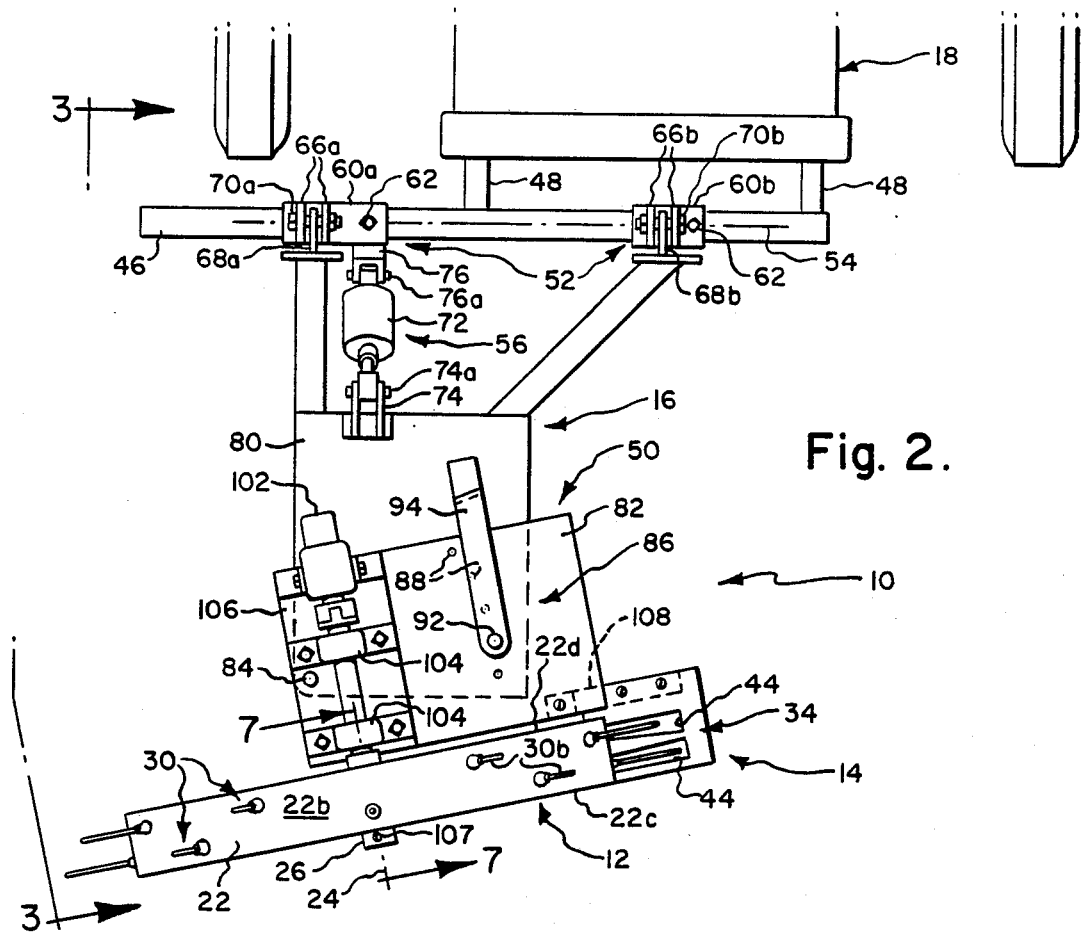
FIG. 2 is a top plan view thereof with the rake elevated to arrange the rake wheel in a vertical plane, such that its vertical tilt angle is zero.

A brush rake formed in accordance with a preferred form of the present invention is designated as 10 and best shown in FIGS. 1, 2 and 3 as generally comprising a rake wheel 12 intended to be driven for rotation in the direction indicated by arrow 12a in FIG. 1; a comb or plow 14; and a mounting assembly 16 for mounting or supporting the wheel and comb forwardly of a vehicle, such as a conventional farm tractor 18, adapted to be driven lengthwise of a row of grape vines 20 from which brush or trimmings is to be removed.

Wheel 12 is shown in the drawings as including an annular rim 22 having inner and outer peripheral surfaces 22a and 22b, respectively, which are disposed concentrically of the axis 24 about which the wheel rotates, and essentially parallel marginal edges 22c and 22d; an inner mounting tube 26 disposed concentrically of axis 24 and having an overall length exceeding the distance between the marginal edges of the rim; and a pair of generally conically shaped and oppositely facing side walls 28a and 28b. As best shown in FIG. 7, side walls 28a and 28b have apertured apex portions fixed, as by welding, to opposite ends of mounting tube 26 in essential radial alignment with marginal edges 22c and 22d respectively. The outer peripheral portions of the side walls are fixed, as by welding, to rim inner surface 22a inwardly of marginal edges 22c and 22d, such that marginal bands 22a' and 22a" of the inner surface are exposed for view. By referring to the drawings, it will be understood that rim 22 is formed with two series of apertures 22e and 22f, which are shown only in FIG. 7 and extend between inner and outer surfaces 22a and 22b within the areas defined by bands 22a' and 22a". The apertures in each series are bisected by a common plane and have a uniform annular spacing therebetween with the apertures of one series being staggered relative to the apertures of the other series.

Wheel 12 is provided with a plurality of spring teeth 30 associated one with each of the above mentioned apertures, such that teeth 30 are arranged in two rows of uniformly spaced teeth with the teeth of one row being staggered relative to the teeth of the other row. Specifically, each of teeth 30 includes a mounting plate 30a having a convex mounting surface, straignt rake tooth or rod 30b and a resiliently deformable member 30c for coupling an inner end of the rake tooth to the mounting plate so as to resiliently bias the rake tooth to assume a position normal to the convex surface. Mounting plate 30a is intended to be removably fixed to rim inner surface 22a by means of bolts 30d such as to arrange member 30c within an associated one of the rim apertures and position rake tooth 30b to extend radially outwardly of wheel outer surface 22b. Teeth of the type illustrated were fabricated from commercially available rake teeth, which are intended for use on side-delivery rakes and bear U.S. Pat. No. 3,019,586. Such commercially available teeth, as sold, have a "C" shaped mounting plate adapted to have its inner surface engage about or surround a mounting tube to which the mounting plate is clamped and a rake tooth bent intermediate its ends. Thus, the original mounting plate must be flattened out sufficiently to have its outer surface generally conform to the curvature of surface 22a and the original rake tooth straightened such that it extends normal to surface 22b throughout its length.

Comb 14, is best shown in FIGS. 4, 5 and 6, as generally including a divider or rake tooth guide portion 32 and a separator portion 34. Divider portion 32 is arranged to extend normal to rim 22 intermediate the rows of teeth 30 and has an arcuate edge portion 35 best shown in FIG. 4 as being arranged in relatively close proximity to the rim outer surface 22b; an upper edge portion 38, which extends from adjacent an upper end of arcuate edge portion 36 in a direction away from surface 22b; and a lower edge portion 40, which extends from adjacent a lower end of the arcuate edge portion in a direction away from the rim. Preferably, divider portion 32 is of wedge shaped cross sectional configuration, as best shown in FIGS. 5 and 6, wherein its apex portion is defined by lower edge portion 40. More specifically, it is preferable to define divider portion 32 by a pair of generally triangular plates 42 and 42 having relatively straight first edges joined, as by welding to define lower edge portion 40; upwardly divergent and arcuately shaped second edges, which cooperate to define arcuate edge portion 36; and relatively straight third edges, which cooperate to define upper edge portion 38.

Separator portion 34 extends transversely adjacent the upper edge portion of divider portion 32 and is shaped to define a pair of slot openings 44, which are arranged one on each side of the divider portion and in alignment with associated ones of the rows of teeth 30. Preferably, separator portion 34 is in the form of a flat plate of a generally E-shaped construction, which has its lower surface fixed to plates 42, as by welding, and lies within a plane disposed parallel to the axis of rotation of wheel 12. It will be noted that the outer or oppositely facing surfaces of plates 42 and 42 are preferably flush with the adjacent edges of slots 44 and 44, as best shown in FIG. 6, thereby to prevent underengagement of rake teeth 30b with separator portion 34 in the event such teeth of adjacent rows become drawn or deformed towards one another by the brush being removed.

Mounting assembly 16 is best shown in FIGS. 2 and 3 as included a channel 46; means, such as weldments 48, for mounting channel 46 on vehicle 18 to extend generally horizontally and transversely adjacent a front end thereof; a support frame 50 for carrying wheel 12 and comb 14; hinge means 52 for mounting support frame 50 on channel 46 for pivotal movement about a hinge axis 54 extending lengthwise of the channel; and control means 56 for coupling hinge means 52 and frame 50 for controlling pivotal movement of the latter about hinge axis 54 to vary the degree of vertical tilt of wheel rotational axis 24, as required for varying trellis heights within the practical operating range of the present brush rake. Maintenance of a proper vertical tilt angle for wheel 12 is critical to the proper operation of the present brush rake.

Hinge means 52 is best shown in FIGS. 2 and 3 as including a pair of channel sections 60a and 60b, which are slidably supported on channel 46 for movement lengthwise thereof; means, such as threaded lock screws 62, for releasably fixing the channel sections to the channel in adjusted positions lengthwise thereof; first hinge brackets 66a and 66b fixed to channel sections 60a and 60b; second hinge brackets 68a and 68b fixed to support frame 50; and hinge pins 70a and 70b for hingedly connecting the first and second brackets for relative movement about hinge axis 54. Preferably, channel 46 is in the form of a hollow square tube and channel sections 60a and 60b are of like cross section and sized to slidably receive channel 46.

Control means 56 is also best shown in FIGS. 2 and 3 as including a fluid operated cylinder, such as a hydraulic cylinder 72 extensible and retractable under the control of a vehicle operator, and means in the form of mounting brackets 74 and 76 and associated pins 74a and 76a for pivotally connecting opposite ends of cylinder 72 to support frame 50 and channel section 60a. Hinge pins 74a and 76a are arranged parallel to hinge axis 54, such that extensions and contractions of cylinder 72 serve to control the pivotal position of support frame 50 about hinge axis 54 and thus to vary the degree of vertical tilt of wheel rotational axis 24.

Support frame 50 is shown in FIGS. 2 and 3 as including a first part 80, which is rigidly fixed to second hinge brackets 68a and 68b and mounting bracket 74; a second part 82 for carrying wheel 12 and comb 14; a pivot coupling, such as may be defined by a pivot pin 84, for supporting second part 82 for movement relative to first part 80 about a pivot axis arranged normal to hinge axis 54; and suitable adjustment means 86 for selectively varying the pivotal position of second part 82 relative to first part 80 about the axis of pivot pin 84 to vary the degree of lateral tilt of wheel rotational axis 24. Adjustment means 86 may comprise a series of holes 88 formed in second part 82 and arranged along an arc disposed concentrically of the rotational axis of pivot pin 84, and a hole 90 formed in first part 82 and arranged for alignment selectively with holes 88, and a shear pin 92 removably received within hole 90 and aligned ones of holes 88. In the illustrated construction, a rigid strap 94 has its rearwardly disposed end fixed, as by welding, to first part 80 and its forwardly disposed end arranged to overlie second part 82; the latter being provided with an aperture, not shown, which is disposed in alignment with hole 90 and sized to loosely receive the upper end of shear pin 92.

By again referring to FIGS. 2 and 3, it will be seen that wheel 12 is mounted on second part 82 by means of a drive shaft 100 having its forwardly and rearwardly disposed ends coupled respectively to wheel 1 and a hydraulically operated drive motor 102. Drive shaft 100 is supported intermediate its ends by a pair of bearing blocks 104 and 104, which together with motor 102 are mounted on part 82 by a mounting bracket 106. As best shown in FIG. 7, the inner tube 26 of wheel 12 is sized to slidably receive the forwardly extending end of the drive shaft 100 and is non-rotatably keyed thereto, as by a threaded bolt 107 sized to pass through apertures in the tube and drive shaft. Motor 102 may be of conventional construction and suitably controlled by the operator of the vehicle.

Plow 14 may be fixed to second part 82 of the support frame by any suitable means, such as by a bolt or weld fixed mounting plate 108.

As by way of specific example of a presently preferred construction, brush rake 10 is provided with a 32" diameter wheel 12 having two, seven tooth rows of teeth 30, wherein rake teeth 30b have a length of approximately 9" and the spacing between rows is about 4". Wheel rim 22 is approximately 7" wide with the outer peripheral portion of side walls 28a and 28b being inset sufficiently to permit mounting of mounting plates 30a, whose width slightly exceeds 2". Early experiments conducted with a 24" diameter wheel having two, five tooth rows of teeth with projecting or effective lengths of 5" revealed that the present 32" diameter wheel and possibly larger diameter wheels are to be preferred, due to their overall efficiency in removing brush from diversely trained vines.

Comb 14 is fabricated such that upper edge portion 38, and thus separator portion 34, lies within a plane, which is disposed essentially parallel to wheel rotational axis 24 and tilts downwardly and outwardly of the wheel as best shown in FIG. 4. It presently appears that the most effective orientation of such plane is one in which the tip or outer ends of rake teeth 30b enter slots 44 before the root ends thereof. For the present 4" spacing between rows of teeth, an effective slot size has been found to be about 2" wide with a slot spacing of about 3". The depth of the slots must be sufficient to permit clearance of the rake teeth, when arcuate surface portion 36 is spaced sufficiently outwardly of rim 22 to prevent engagement therebetween, while accommodating for any non-concentricity likely to be developed under field operating conditions. It was also determined that brush was most effectively removed from teeth 30, as the lower end of arcuate surface portion 36 and thus lower edge portion 38, approaches the bottom of wheel 12, so as to permit brush removal to be initiated as close as possible to the bottom of the wheel where the effective direction of brush movement is more or less horizontal. Moreover, under normal wheel operating conditions, lower edge portion 38 was found to preferably lie essentially horizontal or to slightly tilt in a direction upwardly and outwardly relative to wheel 12.

During test operations, vehicle 18 was comfortably driven at about 4 mph and wheel 12 driven at speeds between 100 and 300 RPM depending on the type of vine being cleaned of brush, and resulted in the efficient cleaning of about two acres per hour. It was found that umbrella trained vines required maintenance of of a higher wheel RPM than other vines, but in all cases the most effective speed for brush removal purposes was the minimum speed at which brush could be cleanly removed.

Also, it was determined that it was critical to proper operation of the present brush rake to arrange the rotational axis of wheel 12 to both tilt vertically downwardly and forwardly away from the vehicle and laterally away from the row of vines. Presently preferred angles of vertical and lateral tile are on the order of about 22° and 18°, respectively, for the illustrated vehicle mounting arrangement and trellis heights normally encountered in the eastern United States; e.g., upwards of approximately 5'. The given values of the preferred tilt angles are necessarily approximate values in that same are difficult to measure under field conditions, and thus it is believed that the most effective or preferred range for such tilt angles is on the order of plus or minus 5° to 10° to the measured values thereof, except for the lateral tilt angle wherein it appears undesirable to decrease same by more than about 5°. As these tilt angles are reduced, such that the wheel rotational axis approaches a position in which it is horizontal and parallel to the row, the effectiveness of the teeth 30 for brush removal purposes is diminished and a subsequent manual brush removal operation is required. At zero tilt angles, teeth 30 tend to tear the vines without removing brush and the effective operating life of such teeth is greatly shortened, so as to render impractical operation under such conditions. Thus, for trellis heights above approximately 5', the illustrated vehicle mounting arrangement would have to be modified by raising channel 46 or by replacing such mounting arrangement with one capable of selective vertical adjustments, such as a vertical telescopic mounting arrangement of the type disclosed, for example, in U.S. Pat. No. 4,383,400 for use with a brushing machine. On the other hand, as the tilt angles are increased, teeth 30 become less effective for brush removal purposes; any substantial increase in lateral tilt angle also being undesirable for the reason that it shortens the effective lateral distance between the rake wheel and trellis post to an extent where contact therebetween is unavoidable.

While a preferred form of the present invention has been described, it is anticipated that various modifications thereof may be provided without departing fom the spirit of the present invention. As by way of example, it is contemplated that the rake wheel may be fitted with only one or more than two rows of rake teeth provided that the comb or plow be appropriately modified to accommodate for this change. In this respect, a single row of teeth would likely require that the comb be provided with a separator portion having a single slot and a divider portion in the form of a pair of spaced plates for controlling flexure of or straightening the rake teeth, as they approach such slot. For three rows of teeth, a comb havng three slots in its separator portion would appear to be required in combination with a pair of wedge shaped divider portions of the type illustrated. Further, the preferred wedge shaped comb divider portion could be replaced by a single plate of similar profile, but it is to be expected that this would lead to shortened rake tooth operating life and provide for increased noise of operation.

Still further, it is contemplated that the support frame of the present brush rake may be formed as a one piece unit in which the breakaway feature is dispensed with, providing that the lateral tilt angle of the rake wheel rotation axis does not exceed the presently preferred tilt angle or range thereof and the rake teeth are of a length such as to provide sufficient operating clearance between the rake wheel and trellis posts under normal operating conditions.

Also, while the present invention has been specifically described for use in removing brush from grape vines, it is contemplated that it may possess utility in removing brush or trimmings from other vines and/or bushes or orchard trees typically arranged in rows, providing that means are provided to arrange the present rake wheel at a height permitting same to perform its brush removal operation, while maintained at approximately its most effective vertical tilt angle. Thus, while the term vines has been used in the appended claims for purposes of defining a frame of reference for the present invention, it is intended that such term not be considered limiting as to the scope of protection afforded the present invention.

What is claimed is:

1. A brush rake for removing brush from grape vines arranged in a row and for mounting on a vehicle movable lengthwise of said row, said rake comprising in combination:

a power driven wheel carrying at least one row of teeth projecting outwardly of a peripheral surface thereof for removing brush from said vines incident to rotation of said wheel about its axis of rotation;

a comb for removing brush from said teeth; and mounting means for mounting said wheel and said comb on said vehicle and to arrange said axis to tilt vertically downwardly and forwardly away from said vehicle and to tilt laterally away from said row, as said vehicle moves lengthwise of said row.

2. A brush rake according to claim 1, wherein said wheel includes an annular rim having inner and outer peripheral surfaces disposed concentrically of said axis and essentially parallel marginal edges; an inner mounting tube disposed concentrically of said axis and having a length exceeding the distance between said marginal edges; and a pair of generally conically shaped and oppositely facing side walls having apertured apex portions fixed to said mounting tube in essential radial alignment with said marginal edges and outer peripheral portions fixed to said inner surface of said rim inwardly of said marginal edges, said rim having two series of apertures extending between said inner and outer surfaces and arranged one series between each of said marginal edges and said outer peripheral portions of said side walls, said apertures in each said series having a uniform spacing therebetween annularly of said rim, and said teeth are mounted one within each of said apertures to define two rows of teeth; and each of said teeth includes a mounting plate, a rake tooth and a resiliently deformable member for coupling an inner end of said rake tooth to said mounting plate to bias said tooth rod to assume a position normal thereto, and said mounting plate is fixed to said inner surface of said rim to position said deformable member within one of said apertures and to position said rake tooth to extend outwardly and normal to said outer surface of said rim.

3. A brush rake according to claim 1, wherein said wheel carries two rows of teeth; and said comb includes a divider portion and a separator portion, said divider portion extending generally normal to said peripheral surface intermediate said rows of teeth and having an arcuate edge portion arranged in proximity to said peripheral surface, an upper edge portion extending from adjacent an upper end of said arcuate edge portion in a direction away from said peripheral surface and a lower edge portion extending from adjacent a lower end of said arcuate edge portion in a direction away from said peripheral surface, and said separator portion extends transversely adjacent said upper edge portion and is formed with a pair of slot openings arranged one on each side of said divider portion and in alignment with and for receipt of each of said rows of teeth therewithin.

4. A brush rake according to claim 3, wherein said divider portion is of wedge shaped cross sectional configuration having an apex defined by said lower edge portion, and oppositely facing surfaces of said divider portion are aligned with adjacent edges of said slots.

5. A brush rake according to claim 4, wherein said divider portion is defined by a pair of generally triangular plates joined along first edges thereof to define said lower edge portion, said plates having upwardly divergent arcuately shaped second edges cooperating to define said arcuate edge portion and third edges cooperating to define said upper edge portion; and said separator portion is a plate having a lower surface fixed to said third edges and said plate lies within a plane disposed parallel to said axis of rotation of said wheel.

6. A brush rake according to claim 1, wherein said comb includes a divider portion extending generally normal to said peripheral surface and having an edge portion wherein at least a lower end thereof is disposed in proximity to said peripheral surface adjacent a bottom of said wheel, a lower edge portion extending from adjacent said lower end in a direction away from said wheel and a separator portion disposed transversely of said divider portion and extending from adjacent an upper end of said edge portion in a direction away from said wheel, said separator portion having a slot opening for freely receiving teeth of said row therewithin.

7. A brush rake according to claim 6, wherein said divider portion guides said row of teeth for receipt within said slot.

8. A brush rake according to claim 1, wherein said axis has a vertical tilt on the order of 22° plus or minus about 10° and a lateral tilt on the order of 18° plus about 10° or minus about 5°.

9. A brush rake according to claim 1, wherein said mounting means includes a channel, means for mounting said channel on said vehicle to extend generally horizontally and transversely adjacent a front end thereof, a support frame for carrying said wheel and said comb, hinge means for mounting said support frame on said channel for pivotal movement about a hinge axis extending lengthwise of said channel, said hinge means including means for supporting same on said channel for adjustable displacements lengthwise of said hinge axis and for releasably fixing said hinge means against displacement with respect to said channel, and control means coupling said hinge means and said support frame for controlling the pivotal position of said support frame about said hinge axis to vary the degree of vertical tilt of said axis.

10. A brush rake according to claim 9, wherein said means of said hinge means includes a pair of channel sections slidably supported on said channel for movement lengthwise thereof, means to releasably fix said channel sections to said channel in adjusted positions lengthwise thereof, first hinge brackets fixed to said channel sections, second hinge brackets fixed to said support frame and hinge pins hingedly connecting said first and second hinge brackets, one of said channel sections additionally having a vertically downwardly extending mounting bracket; and said control means includes a fluid operated cylinder and means to pivotally couple opposite ends of said cylinder to said support frame and to said mounting bracket of said one of said channel sections for pivotal movement about pivot axes disposed parallel to said hinge axis.

11. A brush rake according to claim 10, wherein said support frame has a first part coupled to one of said opposite ends of said cylinder and fixed to said second hinge brackets, a second part carrying said wheel and said comb, a pivot coupling said second part to said first part for relative movement about a pivot axis arranged normal to said hinge axis, and adjustment means for selectively varying the pivotal position of said second part relative to said first part about said pivot axis to vary the degree of lateral tilt of said axis.

12. A brush rake according to claim 11, wherein said adjustment means includes a series of holes in one of said first and second parts arranged along an arc disposed concentrically of said pivot axis, a hole in the other of said first and second parts arranged for alignment selectively with said holes of said series, and a shear pin removably received in said hole and aligned ones of said holes of said series.

13. A brush rake according to claim 9, wherein said wheel includes an annular rim having inner and outer peripheral surfaces disposed concentrically of said axis and essentially parallel marginal edges; and inner mounting tube disposed concentrically of said axis and having a length exceeding the distance between said marginal edges; and a pair of generally conically shaped and oppositely facing side walls having apertured apex portions fixed to said mounting tube in essential radial alignment with said marginal edges and outer peripheral portions fixed to said inner surface of said rim inwardly of said marginal edges, said rim having two series of apertures extending between said inner and outer surfaces and arranged one series between each of said marginal edges and said outer peripheral portions of said side walls, said apertures in each said series having a uniform spacing therebetween annularly of said rim with said apertures of one of said series being staggered relative to the apertures of the other of said series, and said teeth are mounted one within each of said apertures; and each of said teeth includes a mounting plate having a convex mounting surface, a straight rake tooth and a resiliently deformable member for coupling an inner end of said rake tooth to said mounting plate to bias said rake tooth to assume a position normal to said convex surface, and said mounting plate is fixed to said wheel with said convex surface facing said inner surface to position said deformable member within one of said apertures and to position said rake tooth to extend outwardly and normal to said outer surface of said wheel.

14. A brush rake according to claim 9, wherein said wheel carries two rows of teeth; and said comb includes a divider portion and a separator portion, said divider portion extending normal to said peripheral surface intermediate said rows of teeth and having an arcuate edge portion arranged in proximity to said peripheral surface, an upper edge portion extending from adjacent an upper end of said arcuate edge portion in a direction away from said peripheral surface and a lower edge portion extending from adjacent a lower end of said arcuate edge portion in a direction away from said peripheral surface, and said separator portion extends transversely adjacent said upper edge portion and is formed with a pair of slot openings arranged one on each side of said divider portion and in alignment with each of said rows of teeth for receiving said therewithin.

15. A brush rake according to claim 14, wherein said divider portion is of wedge shaped cross sectional configuration having an apex defined by said lower edge portion.

16. A brush rake according to claim 14, wherein said divider portion is defined by a pair of generally triangular plates joined along generally straight first edges thereof to define said lower edge portion, said plates having upwardly divergent arcuately shaped second edges cooperating to define said arcuate edge portion and generally straight third edges cooperating to define said upper edge portion, said third edges being aligned with adjacent edges of said slots; and said separator portion is a plate having a lower surface fixed to said third edges and said plate lies within a plane disposed parallel to said axis of rotation of said wheel.

17. A brush rake according to claim 16, wherein said wheel includes an annular rim having inner and outer peripheral surfaces disposed concentrically of said axis and essentially parallel marginal edges; an inner mounting tube disposed concentrically of said axis and having a length exceeding the distance between said marginal edges; and a pair of generally conically shaped and oppositely facing side walls having apertured apex portions fixed to said mounting tube in essential radial alignment with said marginal edges and outer peripheral portions fixed to said inner surface of said rim inwardly of said marginal edges, said rim having two series of apertures extending between said inner and outer surfaces and arranged one series between each of said marginal edges and said outer peripheral portions of said side walls, said apertures in each said series having a uniform spacing therebetween annularly of said rim with said apertures of one of said series being staggered relative to the apertures of the other of said series, and said teeth are mounted one within each of said apertures; and each of said teeth includes a mounting plate having a convex mounting surface, a rake tooth and a resiliently deformable member for coupling an inner end of said rake tooth to said mounting plate to bias said rake tooth to assume a position normal to said convex surface, and said mounting plate is fixed to said wheel with said convex surface facing said inner surface to position said deformable member within one of said apertures and to position said rake tooth to extend outwardly and normal to said outer surface of said wheel.

18. A brush rake according to claim 2, wherein said comb includes a divider portion arranged intermediate said rows of teeth and extending normal to said peripheral surface, said divider portion having a lower end disposed in proximity to said peripheral surface adjacent to the bottom of said wheel and a generally horizontally disposed lower edge portion extending from adjacent said lower end in a direction away from said wheel; and a separator portion in the form of a plate lying within a plane disposed essentially parallel to said axis and having a pair of slot openings aligned with and sized to freely receive said rows of teeth therewithin.

19. A brush rake according to claim 17, wherein said divider portion has opposite side surfaces aligned with adjacent edges of said slots and said opposite surfaces define a wedge shaped configuration whose apex defines said lower edge portion.

20. A brush rake according to claim 18, wherein said axis has a vertical tilt on the order of 22° plus or minus about 10° and a lateral tilt on the order of 18° plus about 10° or minus about 5°.

21. A brush rake according to claim 1, wherein said mounting means includes a channel; means for mounting said channel on said vehicle to extend generally horizontally and transversely adjacent a front end thereof; a support frame for carrying said wheel and said comb; hinge means for mounting said supoprt frame on said channel for pivotal movement about a hinge axis extending lengthwise of said channel; and a fluid operated cylinder for controlling the pivotal position of said support frame about said hinge axis to vary the vertical tilt of said axis, said hinge means includes first hinge brackets, means to removably fix said first hinge brackets to said channel in adjusted positions lengthwise thereof, second hinge brackets fixed to said support frame, hinge pins for connecting said first and second hinge brackets and a mounting bracket fixedly connected to and depending vertically downwardly from adjacent one of said first hinge brackets, and said cylinder has opposite ends thereof coupled to said support frame and said mounting bracket.

* * * * *